United States Patent [19]

Piening et al.

[11] Patent Number: 5,735,486

[45] Date of Patent: Apr. 7, 1998

[54] AIRCRAFT WING

[75] Inventors: Matthias Piening; Arno Pabsch; Christof Sigle, all of Braunschweig, Germany

[73] Assignee: Deutsche Forschungsanstalt fur Luft-und Raumfahrt e.V., Bonn, Germany

[21] Appl. No.: 696,029

[22] Filed: Aug. 9, 1996

[30] Foreign Application Priority Data

Aug. 11, 1995 [DE] Germany .................. 195 29 476.9

[51] Int. Cl.$^6$ .............. B64C 3/18; B64C 11/20; F01D 5/14
[52] U.S. Cl. .............. 244/124; 244/133; 416/230
[58] Field of Search .................. 244/123, 124, 244/131, 133, 35 R; 416/229, 230

[56] References Cited

U.S. PATENT DOCUMENTS

| | | | |
|---|---|---|---|
| 2,451,458 | 10/1948 | Watter | 244/124 |
| 3,273,833 | 9/1966 | Windecker | 244/124 |
| 3,416,756 | 12/1968 | Windecker | 244/123 |
| 3,473,761 | 10/1969 | Chutter | 244/123 |
| 3,567,407 | 3/1971 | Yoblin | 244/123 |
| 3,893,639 | 7/1975 | Croswell, Jr. | 244/123 |
| 3,950,115 | 4/1976 | Euler | 244/123 |
| 4,411,940 | 10/1983 | Derkacs et al. | 244/123 |
| 4,667,905 | 5/1987 | Hamm et al. | 244/123 |
| 4,811,540 | 3/1989 | Kallies et al. | 244/123 |
| 4,966,802 | 10/1990 | Hertzberg | 244/132 |
| 5,332,178 | 7/1994 | Williams | 244/123 |
| 5,496,002 | 3/1996 | Schütze | 244/123 |

FOREIGN PATENT DOCUMENTS

| | | |
|---|---|---|
| 0 235 512 B1 | 1/1987 | European Pat. Off. . |
| 0 248 161 B1 | 10/1993 | European Pat. Off. . |
| 0 556 088 B1 | 1/1996 | European Pat. Off. . |
| 36 14 618 A1 | 11/1987 | Germany . |
| 37 39 753 A1 | 6/1989 | Germany . |
| 36 05 256 C2 | 3/1991 | Germany . |
| 43 29 744 C1 | 9/1994 | Germany . |

OTHER PUBLICATIONS

*VDI Zeitschrift Band 109 No. 24*, Aug., 1967, pp. 1121–1160 Abstract of German language article by Horst Wurtinger.

*Primary Examiner*—Virna Lissi Mojica
*Attorney, Agent, or Firm*—Salter & Michaelson

[57] ABSTRACT

In a wing with wing shells with good shear strength made of fibrous composite materials, particularly fiber-reinforced plastics, for aircraft, members taking up tensile and compressive forces are attached to the inside of the wing shells. These members have unidirectional fibers extending longitudinally of the wing. Stringers spaced longitudinally of the wing are provided on the inside of the wing shells, their fiber component being formed by a fiber ply joined to the fiber ply of the wing shell. Unidirectional fibre bundles are arranged between spaced stringers, the bundles being embedded with good shear strength in the synthetic resin matrix of the wing shells, extending longitudinally of the wing and having a substantially rectangular cross-section.

14 Claims, 4 Drawing Sheets

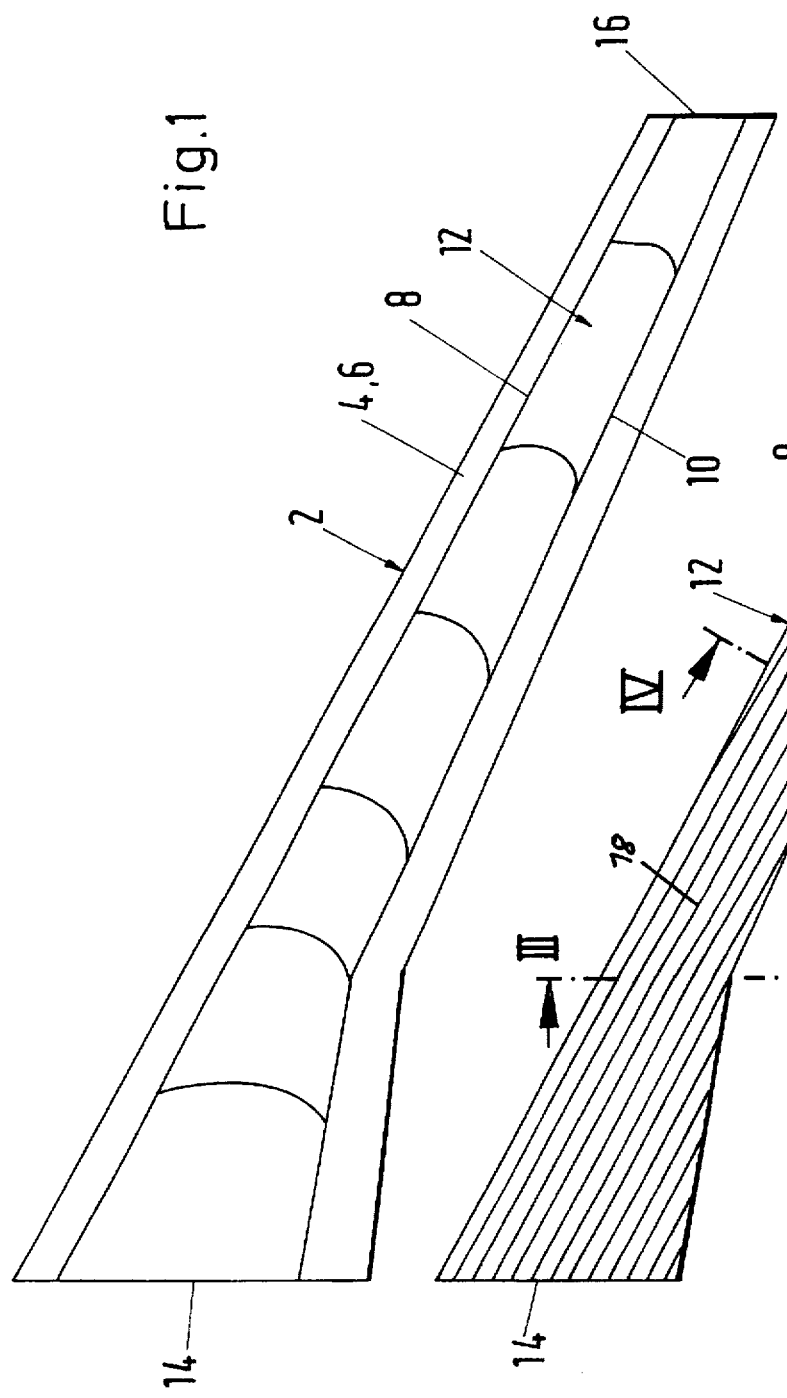
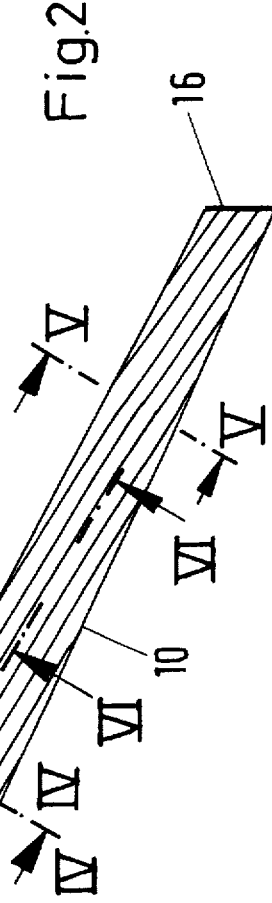

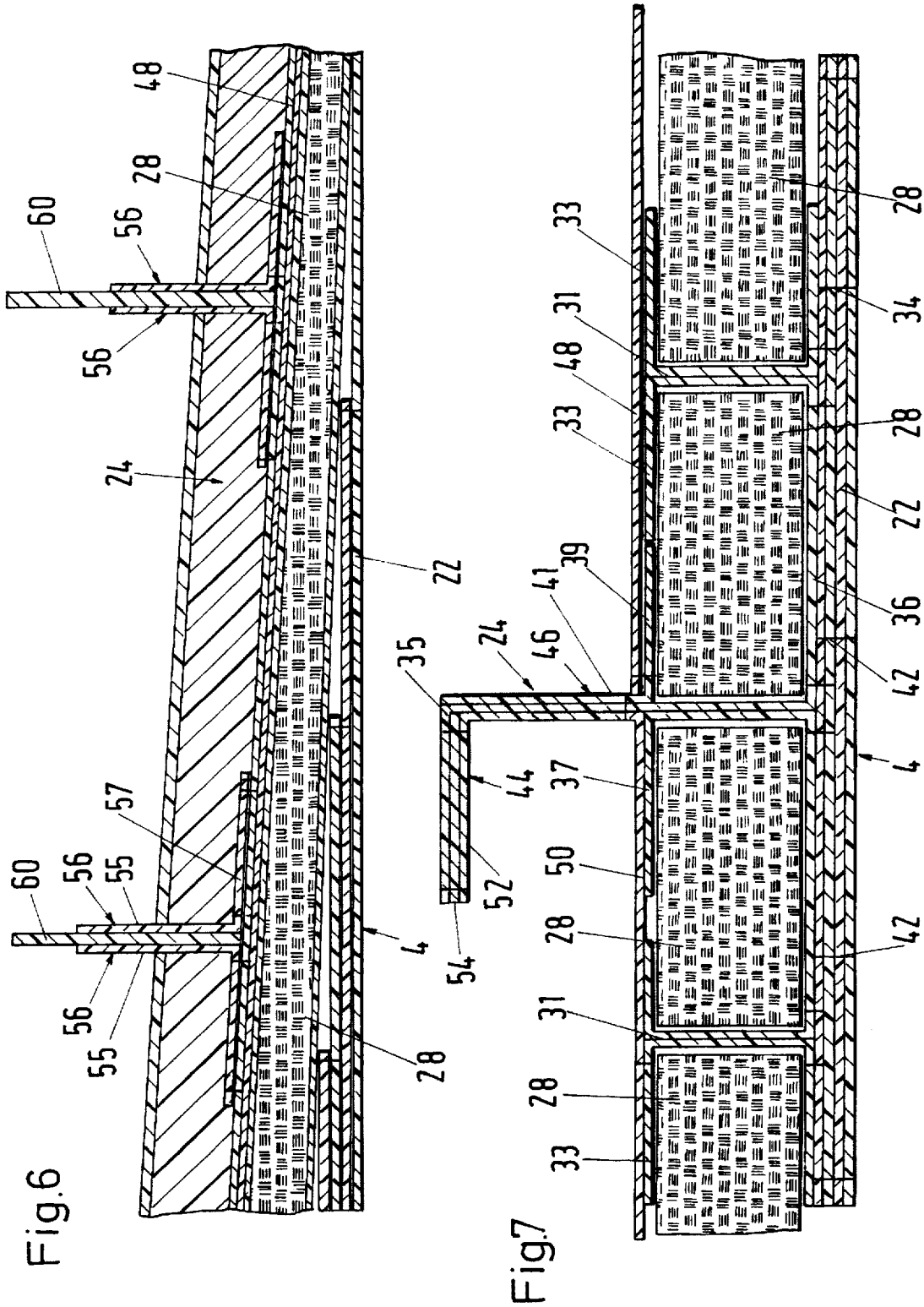

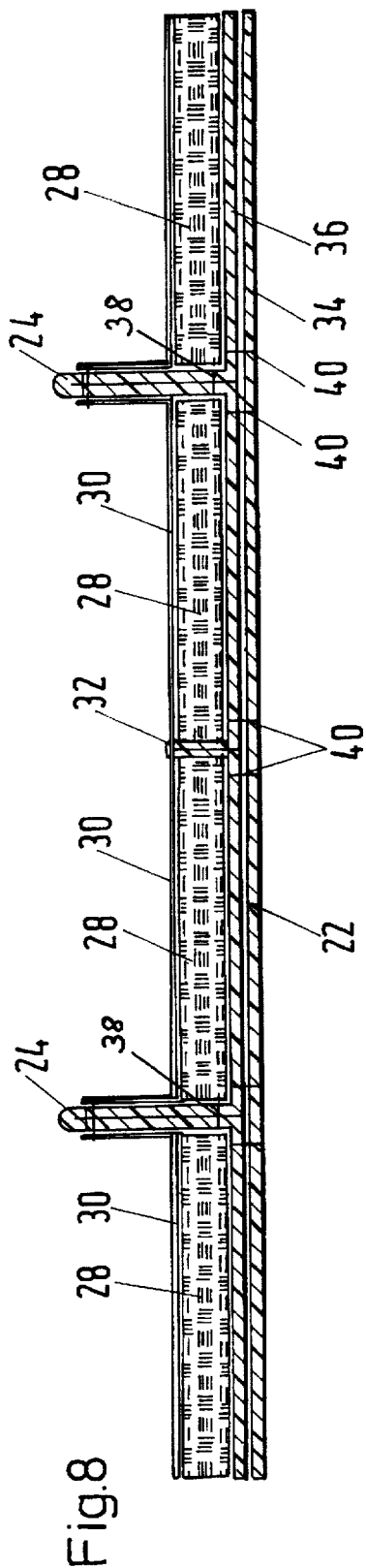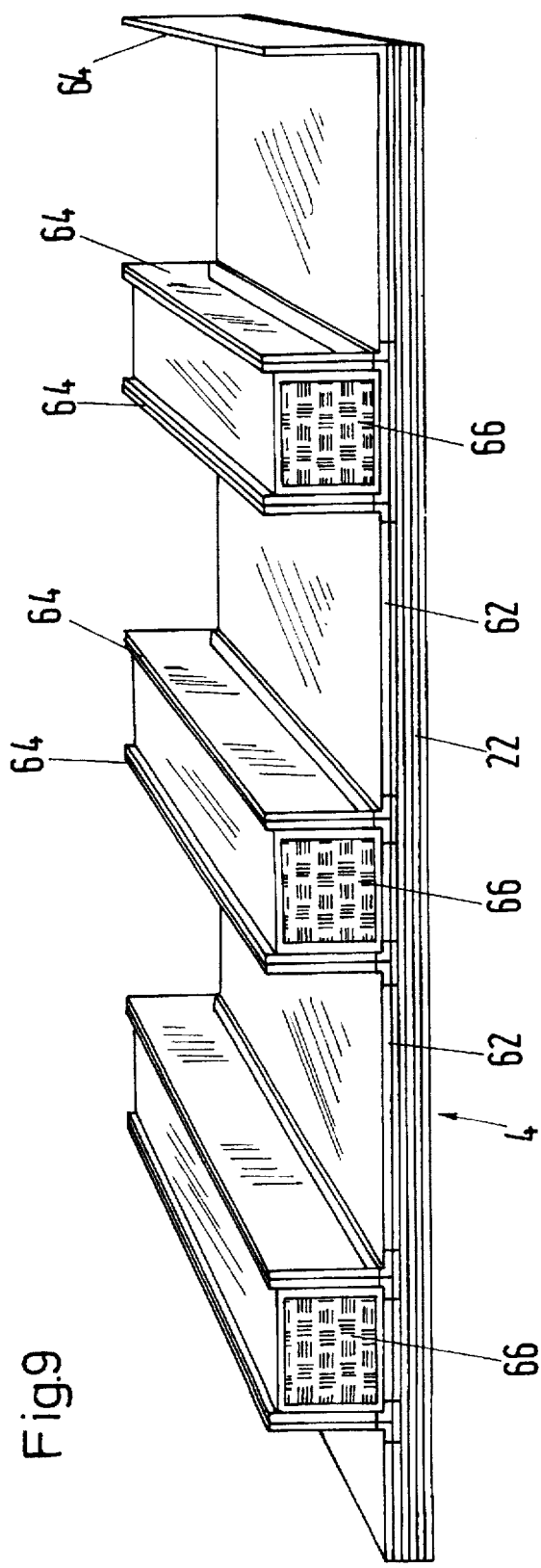

AIRCRAFT WING

FIELD OF THE INVENTION

The invention relates to a wing with wing shells with good shear strength made of fibrous composite materials, particularly fibre-reinforced plastics, for aircraft, wherein members taking up tensile and compressive forces are mounted on the inside of the wing shells and have unidirectional fibres extending longitudinally of the wing.

BACKGROUND OF THE INVENTION

Shell components of this type generally include the wing skin and stringers connected to it. Longitudinal forces are transmitted both by the skin and the stringers. The stringers or other members increasing the flexural strength are adhered to the wing skin in wings known e.g. from DE 36 618 A1. However, adhesion creates problems relating to the damage tolerance of the shell, particularly partial detachment of individual stringers from the wing shell as a result of impact loads, with ensuing propagation of the damage at a damaged location. Consequently skin-stringer connections are frequently ensured by rivets in addition to the adhesion joint.

DE 43 29 744 C1 describes a wing in which rods, with a tubular wall of fibrous composite material on a foam core with at least one layer of paraxial unidirectional fibres and a superimposed woven tube with fibres intersecting at an angle to the axis of the rod, are used to obtain the necessary flexural strength.

The rods, which in this construction also act as stringers, are combined in pairs or bundles of three which are provided with a sheath with good shear strength and are stuck to the interior of the wing shell side by side. At the centre section of the wing the rods are provided with rotationally symmetric connecting members for axial introduction of tensile and compressive forces, provided with a coaxial connecting screw thread. With this design the rods are arranged with the axes perpendicular to the rib at the centre section. However, this limits the choice of position for the straight rods within the wing shell. Hence the design can only be applied to wings where an appropriate proportion of the rods can extend at right angles to the tip of the wing.

The arrangement in DC 43 29 744 C1 also works with adhesion joints.

The object of the invention is to construct a wing of the generic type so that the wing including all the stiffening elements can be made substantially without any adhesion joints.

SUMMARY OF THE INVENTION

According to the invention the other object is met by a wing comprising wing shells with good shear strength made of fibrous composite materials, particularly fibre-reinforced plastics, for aircraft, wherein members taking up tensile and compressive forces are mounted on the inside of the wing shells and have unidirectional fibres extending longitudinally of the wing, wherein spaced stringers are made on the inside of the wing shells and longitudinally of the wing, their fibre component being formed by a fire skin which is joined to the fibre skin of the wing shell, and wherein unidirectional fibre bundles are arranged between spaced stringers, the bundles being enclosed by a layer (sheath) with good shear strength, extending longitudinally of the wing and having a substantially rectangular cross-section.

Thus unlike the design in DE 43 29 744 C1, according to the invention unidirectional fibres are not combined to form rods and used as stringers.

The stringers are in contrast formed by a fibre portion from a fibre skin which is joined to the fibre skin of the wing shell, and in particularly preferred manner is even formed by folding at least one fibre layer of the torsion skin of the wing shell.

This produces a wing wherein the fibres of the wing skin, the unidirectional stiffening elements and the stringers with their fibre skins are embedded in a plastic matrix. Thus they are all components which can be made integrally in one operation, with a resin injection process preferably being used to impregnate the dry-fabricated fibre skin.

In this way virtually monolithic wings are produced.

The preferably used fibre-reinforced plastics are, particularly preferably, carbon fibre reinforced plastics.

As a means of further increasing stability the space between two stringers, to hold a plurality of fibre bundles, is preferably divided widthwise by intermediate walls extending parallel with the stringers. The resultant partitions of the unidirectional fibre bundles are consequently each substantially rectangular in cross section.

Wings according to the invention can be made in a particularly appropriate manner by injecting resin into the dry fabricated fibre parts.

High damage tolerance is obtained by embedding all fibre parts in the synthetic resin matrix of the wing shells, in conjunction with the design of the unidirectional fibre bundles extending longitudinally of the wing. The layout of the fibre bundles must be designed so that, even if a predetermined number of bundles is destroyed, the aircraft's flying and manoeuvring capabilities will be maintained.

BRIEF DESCRIPTION OF THE DRAWINGS

The preferred embodiment is described below, by way of example only, with reference to the accompanying drawings, in which:

FIG. 1 is a plan view of the preferred embodiment of wing;

FIG. 2 is a plan view of a wing shell in the region of the wing spar;

FIG. 6 is a section taken in the region of the line VI—VI in FIG. 2;

FIG. 7 is a cross-section similar to the sections III—III to V—V with different possible structural details;

FIG. 8 is a section similar to V—V in FIG. 2, and

FIG. 9 is a cross-section through a further embodiment, shown in perspective.

DESCRIPTION OF PREFERRED EMBODIMENTS

Figure 5:
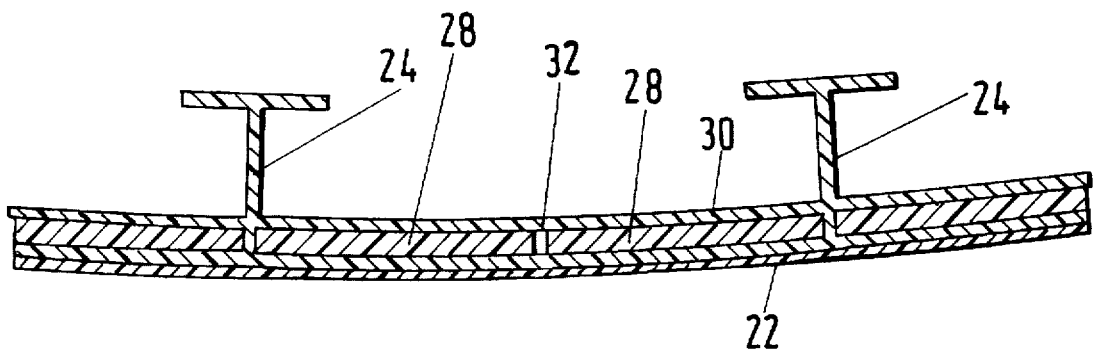
FIG. 5 is a section taken in the region of the line V—V in FIG. 2.

In the preferred embodiment, the wing 2, which is shown in plan in FIG. 1, has an upper and a lower shell 4, 6. These wing shells are interconnected both by cross-ribs (not shown) and by longitudinal walls 8, 10 forming a wing spar box 12. The skin of the wing shells, 4, 6 has good shear strength in known manner, and the shear strength may decrease from the root 14 of the wing towards the tip 16, as indicated by the curved lines. Unidirectional stiffening elements are provided between pairs of web members on the inside of the wing shells, the lower one of which (shell 4) in the region of the spar box 12 is shown diagrammatically in FIG. 2; the stiffening elements are indicated by the longitudinal lines in the drawing, e.g. 18. These unidirectional stiffening elements, which will be described in greater detail later, run substantially parallel, although they may have a different orientation in adjoining regions from that in the root section. This change in orientation, possibly in conjunction with the corresponding gradations of the torsion skin and also in respect of the direction of fibres in the torsion skin, allows adaptation to the aerodynamic stress on the wing on the aero-plastic tailoring principal, for example through an appropriate tensile or flexural torsion coupling.

As illustrated in FIGS. 1 and 2, the wings may be swept both forward or aft. However, the invention may also be applied to non-swept wings.

The wing shells 4, 6 (sections through the lower shell 4 are shown in FIGS. 3 to 9) have layered arrangements of fibre plies 22, the fibres of which are oriented substantially at an angle of +/−45° to the length of the wing shells according to the desired shear strength. The plies are sewn together, as shown in detail in FIGS. 7 and 8 and described below with reference to those figures. The sewing threads are high-strength fibres, particularly carbon or aramide fibres.

Stringers 24 are formed integrally on the top surface of the shell 4; here they are shown as T-shaped at their upper end with laterally projecting flanges 26. Bundles 28 of unidirectional fibres are in each case arranged in the region between adjacent stringers 24 and extend longitudinally of the shells, i.e., in the direction of the longitudinal lines 18 in FIG. 2. An upper covering layer 30 is provided over the bundles, and the fibre orientation in that layer is selected so as to obtain increased transverse flexural strength. In the example illustrated two fibre bundles 28 are arranged between each pair of stringers, and a dividing wall 32 is arranged between those bundles, the height of the wall corresponding to that of the bundles. The dividing walls 32 are also sewn to the plies of the shell 4.

Flanges at the upper ends of the stringers increase the moment of resistance and the buckling strength. Stringers respectively flangeless stringers may also be used to attaching components, e.g. the longitudinal walls of the wing spar box.

The cross-section of the fibre bundles is selected according to the flexural strengths required in the various parts of the wing. It diminishes from the root section 14 to the region of the wing tip 16. Where the stringers 24 are parallel and evenly spaced the height of the fibre bundles thus changes, as will be seen from FIGS. 4 and 5. The thickness of the wing skin is also reduced.

The fibres of the plies 22, stringers 24, bundles 28 and possibly of the dividing walls 32 and cover layer 30 are together embedded in a plastic matrix. The fibre component of the wing shell 4, 6 is preferably fabricated dry and the wing 2 then finished with a resin injection process.

Two plies 34, 36 for the layered fibre plies 22 of the wing shell 4 are shown in FIG. 8. The upper ply 36 may be made up of ply strips folded upwards to form the stringers 24. Thus production can be facilitated without detracting from the strength of the structure, even in the case of tapered, arched wing shells. The folds may be held together in the foot region by stitching 38. The two plies 34, 36 are joined by seams at right angles in the foot region in the immediate vicinity of the folds. Where the torsion skin has more than two plies, as is normally the case, the seams may pass through other fabric layers below these two. The seams near the foot of the folds prevent the stringers 24 from being detached by forces acting perpendicular to the plane of the shell. The horizontal and vertical sewing operation can advantageously be carried out by sewing obliquely in the foot region of the stringers 24.

Figure 4:
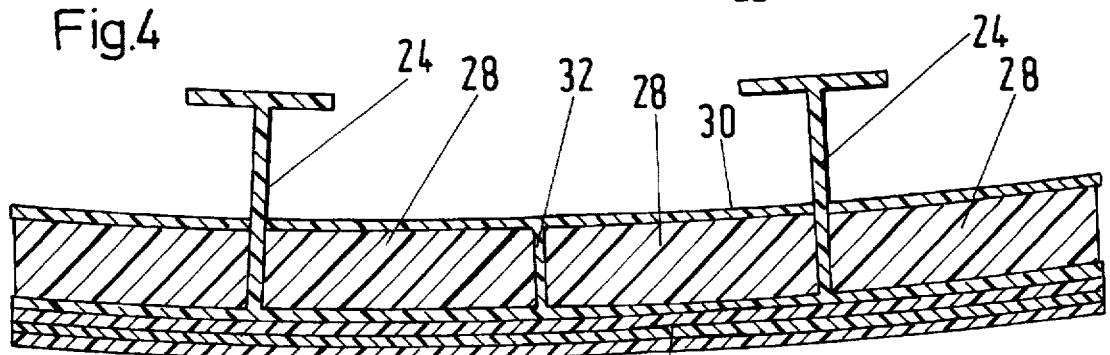
FIG. 4 is a section taken in the region of the line IV—IV in FIG. 2.
Figure 3:
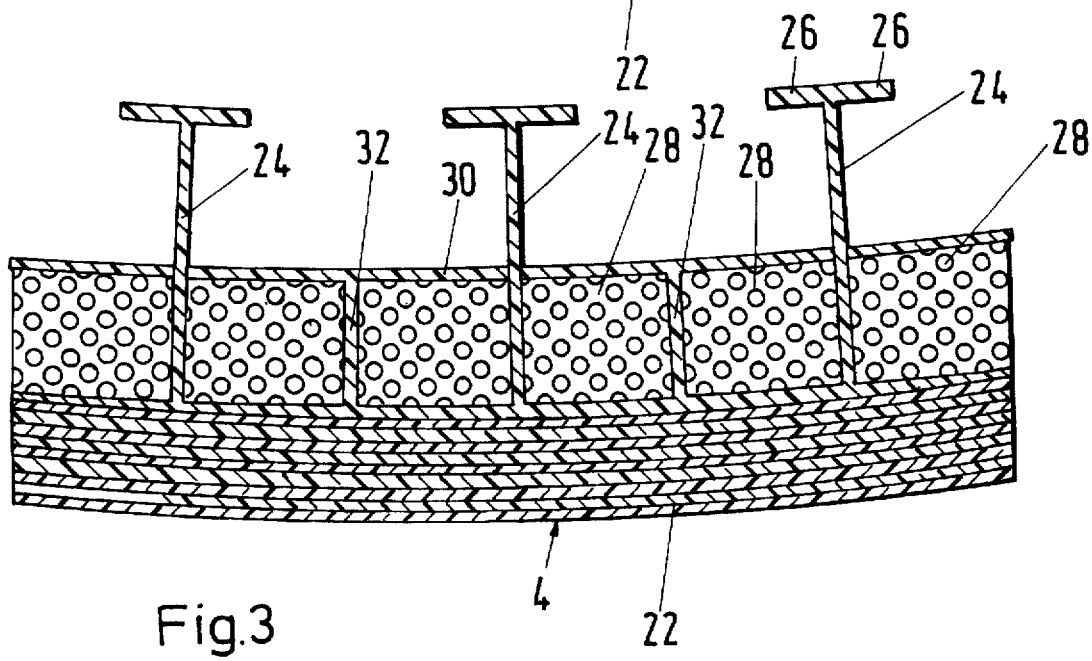
FIG. 3 is a section taken in the region of the line III—III in FIG. 2.

As shown in FIGS. 3 to 5, two fibre bundles 28 with an intermediate wall 32 between them are arranged between two stringers 24. The wall 32 is also preferably formed by a fold in the upper fibre ply 36 and, like the stringers, the fold is joined at the foot by seams to the plies below it. The walls 32 aid in joining the various fibre bundles with good shear strength and attaching them to the wing shell.

The fibre bundles 28 are preferably provided with a sheath with good shear strength. In FIG. 8 they are shown provided with an upper cover layer 30, which is taken upwards at the sides of the folds forming the stringers as a means of diverting the transverse forces into the stringers and simultaneously strengthening the stringers. The plies 22 are preferably also sewn together two-dimensionally outside the seams at the foot of the folds forming the stringers.

In FIG. 7 four continuous fibre plies 22 are joined together by vertical seams 42. Here the fold forming the intermediate wall 32 is bent up and laid laterally over the two adjacent fibre bundles 28 as a cover layer 33. The fold forming the stringer 24 is shown bent up in such a way that one layer 35 extends to the end of the limb 44, here angled to one side, while the other limb 37 of the fold is laid over the adjacent fibre bundles 28. A strip of ply 46 is provided as a cover 39 for the fibre bundle 28 shown to the right of the stringer 24, and has an upright limb 41 lying against the stringer. To the right of the stringer there is a further ply 48; this may extend between two adjacent stringers, lying on the covers 33 of the fibre bundles. To the left of the stringer an arrangement is shown where a layer of ply 50 forming such a cover is guided upwards at the stringer 24 and—angled upwards in this embodiment—forms a bottom ply 52 of the angled limb 44 of the stringer 24. A ply 54 may be provided between the ply 52 and the top layer formed by folding up, thereby producing a unidirectional flange reinforcement longitudinally of the stringer.

The possibilities of forming the stringers and fibre bundle covers from different plies as shown in FIG. 7 illustrate the variety of ways in which the wing shells according to the invention can be constructed.

FIG. 6 shows the formation of connections for transverse ribs in wing shells constructed according to the invention, in a longitudinal section. Two angled strips of ply 56 are provided on the cover layer 48 of the fibre bundle 28 between pairs of stringers 24 across the wing shell 4; they have one limb 57 lying on the cover layer 48 and sewn onto it with vertical seams 58. The upright limbs 55 may be formed by a fold. A further strip of ply 60 is arranged between the upright limbs 55 of the strips 56, to which the rib (not shown) can be attached.

The angular strips 56 and the strip 60 are constructed so that the stringers 24 are bridged by them. Passages may be provided next to the stringers, e.g. to allow fuel to flow unimpeded through the rib attachment regions in the fuel containing region of a "wet" wing.

The gradation of the plies 22 forming the torsion-resistant wing skin longitudinally of the wing shell 4 is shown diagrammatically in FIG. 6.

In the embodiments described above the fibre bundles 28 forming the unidirectional stiffening elements are shown directly adjacent one another in the spar box region, so that these portions cover the whole wing shell surface in that region. This two-dimensional arrangement of the stiffening elements, with the divisions between them provided by walls and stringers, gives these portions high damage tolerance. Damage in one of the fibre bundles cannot be propagated to other bundles, thereby forming cracks. Damage tolerance is increased by having a large number of adjacent fibre bundles. Damage limitation is further obtained by shear-resistant sheathing of the individual fibre bundles, whereby the forces can also be transmitted to adjacent stiffening elements and thus guided laterally around damage locations.

In the arrangement described the bearing functions, i.e. the take-up of tensile and compressive forces, largely do not interact with the torsional forces, which are taken up by the wing shell, and hence no multi-directional laminates are necessary. The stiffness can be adapted almost continuously by changing the cross-section of the unidirectional fibre bundles. The unidirectional stiffness of each bundle can further be oriented according to aero-elastic considerations.

In wings with lower strength requirements, e.g. in smaller aircraft and possibly gliders, it is not necessary to arrange unidirectional stiffening elements over the whole area of the interior of the wing shell 4, 6. Such portions can therefore be arranged spaced from each other according to the stiffness requirements, as shown in FIG. 9. In this embodiment two-layer walls 64 are formed by folding up the top layer of ply 62 in the manner described above; the unidirectional stiffening elements in the form of fibre bundles 66 are accommodated between these walls and are here shown with a cover layer 68, whereby shear-resistant sheathing of the bundles is obtained on all sides. Insofar as is necessary for reasons of stiffness, some of the walls 64 may also be constructed as stringers projecting above the top of the bundles.

Wing shells according to the invention are homogeneous components with thin walls. They can therefore be tested simply and very safely by non-destructive methods such as ultrasound.

The above-mentioned seams or stitching are a safeguard against delamination of the plies. The sewing threads embedded in the matrix have to be inserted in the layers so that the threads run in the direction of the local stress in the region of the seams. At the foot of the stringers and intermediate walls the threads can thus also run obliquely in the fabric layers.

Seams with looping of two threads, such as are normally produced by sewing machines, may lead to weakening of the plies, and particularly through crinkling of the fibres in the region of the skin surfaces to loss of strength. In order to counteract delamination the threads need not necessarily be looped. It is sufficient to use threads, thread loops or lengths of thread which are inserted in the layers of skin without stress, as described in EP 0 556 088 B1 or subsequently published German patent application 196 29 044.9.

Modifications may be made to the above-described embodiments within the scope of the claims, which are to be construed on the basis of the following claims.

We claim:

1. A wing for an aircraft comprising:
wing shells fabricated from fibre-reinforced plastics material having high shear strength, each wing shell including an outer fiber ply, an inside, a center portion, and a tip;
a plurality of spaced apart stringers located on the inside of the wing shells and extending longitudinally substantially along the entire length of the wing, the spaced apart stringers each having a fiber component formed by a fiber ply which is joined to the fiber ply of the wing shell; and
a plurality of fiber bundles arranged between spaced apart stringers as unidirectional stiffening elements, each wing shell having a synthetic resin matrix having high shear strength in which the fiber bundles are embedded, said fiber bundles extending longitudinally along the length of the wing and having a substantially rectangular cross section.

2. The wing as set forth in claim 1, said fiber bundles each having a fiber volume which decreases from the center portion of the wing shells to their tip.

3. The wing as set forth in claim 1, said fiber ply of each wing shell having a fiber volume which varies from the center portion of the wing shell to its tip portion.

4. The wing as set forth in claim 1 further comprising at least one intermediate wall extending in a direction parallel to the stringers and dividing widthwise the space between two adjacent stringers.

5. The wing as set forth in claim 4, said intermediate wall having a height which substantially corresponds to a height of the fiber bundles.

6. The wing as set forth in claim 4, each wing shell having a torsion skin with an inner fiber ply, each stringer and the intermediate wall being formed by folding at least the inner fiber ply of the torsion skin of the wing shell.

7. The wing as set forth in claim 6, said fiber component of each stringer and the intermediate wall being formed by strips of ply which are sewn onto the fiber ply of the torsion skin of the wing shell.

8. The wing as set forth in claim 6, the fiber plies forming the folds being sewn at least onto the inner fiber plies of the wing shell, at a foot of the folds.

9. The wing as set forth in claim 6, the dividing walls having upper edges which are provided with lengths of ply that lie on top of the fiber bundles.

10. The wing as set forth in claim 1, said fiber bundles having outer sides covered by a fiber ply with fibers extending transversely across the longitudinal direction of the bundles.

11. The wing as set forth in claim 10 further comprising fiber plies folded at an angle and stitched to the fiber ply covering the outer sides of the fiber bundles to form a cover, the folded plies extending transversely to fiber strands in the direction of the profile, and engaging over upright limbs of the stringers to form the fiber component of the stringers.

12. A wing for an aircraft comprising:
wing shells fabricated from fiber-reinforced plastics material having high shear strength, each wing shell including an outer fiber ply, an inside, a center portion, and a tip;
a plurality of spaced apart stringers located on the inside of the wing shells and extending longitudinally substantially along the entire length of the wing, the spaced apart stringers each having a fiber component formed by a fiber ply which is joined to the fiber ply of the wing shell;
a plurality of fiber bundles arranged between spaced apart stringers as unidirectional stiffening elements, each wing shell having a synthetic resin matrix having high shear strength in which the fiber bundles are embedded, said fiber bundles extending longitudinally along the length of the wing and having a substantially rectangular cross section; and
at least one intermediate wall extending in a direction parallel to the stringers and dividing widthwise the space between two adjacent stringers.

13. A wing for an aircraft comprising:

wing shells fabricated from fiber-reinforced plastics material having high shear strength, each wing shell including an outer fiber ply, an inside, a center portion, and a tip, each wing shell further having a torsion skin with an inner fiber ply;

a plurality of spaced apart stringers located on the inside of the wing shells and extending longitudinally substantially along the entire length of the wing, the spaced apart stringers each having a fiber component formed by a fiber ply which is joined to the fiber ply of the wing shell, each stringer being formed by folding at least the inner fiber ply of the torsion skin of the wing shell; and a plurality of fiber bundles arranged between spaced apart stringers as unidirectional stiffening elements, each wing shell having a synthetic resin matrix having high shear strength in which the fiber bundles are embedded, said fiber bundles extending longitudinally along the length of the wing and having a substantially rectangular cross section.

14. A wing for an aircraft comprising:

wing shells fabricated from fiber-reinforced plastics material having high shear strength, each wing shell including an outer fiber ply, in inside, a center portion, and a tip;

a plurality of spaced apart stringers located on the inside of the wing shells and extending longitudinally substantially along the entire length of the wing, the spaced apart stringers each having a fiber component formed by a fiber ply which is joined to the fiber ply of the wing shell;

a plurality of fiber bundles arranged between spaced apart stringers as unidirectional stiffening elements, each wing shell having a synthetic resin matrix having high shear strength in which the fiber bundles are embedded, said fiber bundles extending longitudinally along the length of the wing and having a substantially rectangular cross section, said fiber bundles having outer sides covered by a fiber ply with fibers extending transversely across the longitudinal direction of the bundles; and fiber plies folded at an angle and stitched to the fiber ply covering the outer sides of the fiber bundles to form a cover, the folded plies extending transversely to fiber strands in the direction of the profile, and engaging over upright limbs of the stringers to form the fiber component of the stringers.

* * * * *